United States Patent
Velez (10) Patent No.: US 11,148,234 B2
(45) Date of Patent: *Oct. 19, 2021

(54) JACK STAND APPARATUS ADAPTABLE TO VARIOUS DIAMETERS OF PIPE

(71) Applicant: SUMNER MANUFACTURING COMPANY, LLC, Houston, TX (US)

(72) Inventor: Lawrence Velez, Houston, TX (US)

(73) Assignee: SUMNER MANUFACTURING COMPANY, LLC, Houston, TX (US)

(*) Notice: Subject to any disclaimer, the term of this patent is extended or adjusted under 35 U.S.C. 154(b) by 50 days.

This patent is subject to a terminal disclaimer.

(21) Appl. No.: 16/401,710

(22) Filed: May 2, 2019

(65) Prior Publication Data

US 2019/0255663 A1 Aug. 22, 2019

Related U.S. Application Data

(63) Continuation of application No. 14/983,072, filed on Dec. 29, 2015, now Pat. No. 10,279,437.

(51) Int. Cl.
| | |
|---|---|
| *B66F 1/00* | (2006.01) |
| *B23K 37/053* | (2006.01) |
| *F16M 11/04* | (2006.01) |
| *F16M 11/08* | (2006.01) |
| *F16M 11/20* | (2006.01) |
| *F16M 11/28* | (2006.01) |
| *B25H 1/00* | (2006.01) |

(Continued)

(52) U.S. Cl.
CPC ............. *B23K 37/053* (2013.01); *B25H 1/00* (2013.01); *B66F 3/08* (2013.01); *F16L 3/00* (2013.01); *F16M 11/046* (2013.01); *F16M 11/08* (2013.01); *F16M 11/2014* (2013.01); *F16M 11/24* (2013.01); *F16M 11/28* (2013.01); *F16M 11/42* (2013.01)

(58) Field of Classification Search
CPC B66F 3/00; B66F 3/308; F16M 11/00; F16M 3/00; F16M 1/00
USPC ......... 269/17, 47, 52, 57, 100; 254/2 R, 7 B, 254/93 H, 100, 134
See application file for complete search history.

(56) References Cited

U.S. PATENT DOCUMENTS

| | | | | |
|---|---|---|---|---|
| 4,177,978 A | * | 12/1979 | Warsaw .................. | B66F 13/00 254/134 |
| 6,988,719 B2 | * | 1/2006 | Ursell .................... | B23Q 3/105 248/269 |

(Continued)

*Primary Examiner* — Lee D Wilson
(74) *Attorney, Agent, or Firm* — Merchant & Gould P.C.

(57) ABSTRACT

A jack stand apparatus has a frame having a first portion and an outwardly extending second portion, a barrel affixed to the outwardly extending portion so as to have a generally vertical longitudinal axis, a jack screw threadedly received by the barrel, and a plurality of caster wheels removably affixed to the frame. The barrel has an outer end extending outwardly for a first distance from the first portion of the frame. The plurality of caster wheels support the frame for a second distance from a level of the bottom of the caster wheels. The first distance is no more than the second distance. A support head is affixed to an end of the jack screw opposite the barrel. The frame is invertible relative to the caster wheels such that in one position the barrel extends upwardly from the frame and a second position in which the barrel extends downwardly from the frame.

18 Claims, 6 Drawing Sheets

(51) Int. Cl.
*B66F 3/08* (2006.01)
*F16L 3/00* (2006.01)
*F16M 11/24* (2006.01)
*F16M 11/42* (2006.01)

(56) References Cited

U.S. PATENT DOCUMENTS

| | | | |
|---|---|---|---|
| 8,646,731 B2 * | 2/2014 | Burles | F16L 3/16 |
| | | | 248/49 |
| 2010/0264384 A1 * | 10/2010 | Realegeno-Amaya | B66D 1/08 |
| | | | 254/2 R |

* cited by examiner

JACK STAND APPARATUS ADAPTABLE TO VARIOUS DIAMETERS OF PIPE

CROSS-REFERENCE TO RELATED APPLICATIONS

The present application is a continuation of U.S. application Ser. No. 14/983,072, filed on Dec. 29, 2015, now U.S. Pat. No. 10,279,437, which is incorporated herein by reference.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to jack stands. The present invention also relates to jack stands that support various diameters of pipes. More particularly, the present invention relates to jack stands that are adaptable so as to support the pipe above the ground at various levels so as to keep the working height comfortable for welders.

2. Description of Related Art Including Information Disclosed Under 37 CFR 1.97 and 37 CFR 1.98

Small, portable, generally triangular jack stands of been employed for many years for the temporary support of mechanical objects during construction or other working operations. Jack stands are particularly useful in the support and alignment of pipe, such as for positioning adjacent pipe sections and pipe fittings in precise alignment for welding operations. For the support of pipe, screw thread-type jack stands are typically provided with various types of support heads depending upon the construction operation that is to be accomplished. For example, one type of support head may take the form of a V-shaped cradle that receives the pipe to be supported. This type of object support is known in the industry as a "V-head". Where the pipe is to be supported for rotation, a pipe support head having horizontally-arranged, spaced rollers may be employed. This type of object support is referred to as a "roller head".

One particular type of jack stand is known as the "Hi-Low Screw Jack". This jack stand incorporates a generally triangular base incorporating a vertically-oriented support tube. An elevation tube is received in telescoping relation within the support tube and may be manually raised or lowered to position the object support near its desired position. This adjustment may be referred to as a "coarse adjustment". Thereafter, the jackscrew, which is located in telescoping relation within the elevation tube, is manipulated upwardly or downwardly to achieve precise positioning of the support head. This character of adjustment may be referred to as a "fine adjustment".

Most high/low screw jack mechanisms employ a support tube of cylindrical configuration and also incorporate an elevation tube of cylindrical configuration being received in telescoping relation within the support tube. Typically, this type of jack mechanism incorporates a lock mechanism enabling the elevation tube to be secured in substantially immovable relation with the support tube. This type of lock mechanism is of a friction type and incorporates an externally threaded shaft that is received by an internally threaded receptacle of the support tube and is capable of being extended through an aperture in the support tube for frictional engagement with the outer cylindrical surface of the elevation tube.

The jack screw mechanism typically incorporates a drive nut that is received by the course of Acme threads of the jack screw and are rotatably adjustable relative to the jack screw. The drive nut typically defines opposed operating handles for rotation thereof relative to the jack screw. In operation, the drive nut simply rests on the upper extremity of the elevation tube so that rotation of the drive nut achieves vertical movement of the jack screw and the support head carried by the jack screw.

In certain circumstances where diameters of the pipe vary substantially, the prior art jack stands are incapable of allowing the welder to conveniently carry out the necessary welding activities. If a very large diameter pipe would be placed upon the support head of a conventional jack stand, the upper portion of the pipe would be outside of the range of the welder or, at least, difficult to reach by the welder. As such, it becomes difficult to conveniently position such a large diameter pipe for proper manipulation by the operator. Additionally, the location of such large diameter pipe on the support head at an elevated position greatly raises the center of gravity of the pipe. As such, can be possible for the jack stand and the pipe supported thereon to be toppled or unsteady. This can result in potential injury to the operator. Typically, the support heads are located in a fixed position and, as a result, cannot expand so as to more properly support the pipe in a stable configuration. As such, a need has developed so as to provide a jack stand that can be adapted so that large diameter pipe can be maintained in a proper position with a low center-of-gravity that can be conveniently worked by the welder.

In other circumstances, jack stands can have a relatively significant height. As such, they can become difficult to store and to transport. It is often desirable to store jack stands in a relatively small location or to conveniently transport such jack stands.

In other circumstances, very large jack stands may be required so as to accommodate large diameters of pipe. Where various diameters of pipe are being welded, the user must have one type of jack stand available for very large pipe and another type of jack stand available for smaller diameter pipe. As such, need has developed so as to provide a single jack stand that can be utilized for both smaller diameter pipe and for larger diameter pipe.

In the past, various patents have issued relating to such jack stands. For example, U.S. Pat. No. 3,741,509, issued on Jun. 26, 1973 to L. M. Kelly, describes a tripod type jack stand or support device. This tripod jack stand includes a camming means that functions, when activated, to maintain the legs in their folded side-by-side relation with the body of the jack stand. In particular, there is a plurality of legs that are pivotally attached to the barrel of the jack stand. A stationary V-shaped support head is utilized so as to receive the pipe therein. A pair of opposed rollers operate so as to allow the pipe to rotate within the interior of the V-shaped support head.

U.S. Pat. No. 3,602,492, issued on Aug. 31, 1971 to W. E. Petrie, describes a collapsible jack stand which includes an upright member and at least three legs secured to the upright member at the lower end thereof. The legs extend outwardly and downwardly therefrom below the lower end of the upright member. A flexible elongated chain connects the legs and the upright member to brace the legs with respect to the upright member. A work-holding device is mounted on the upper end of the upright member and a pair of arms diverge upwardly therefrom so as to form a generally V-shaped saddle for receiving a cylindrical workpiece. Roller assemblies are mounted on each of the support arms with rollers rotatable about parallel axes extending generally perpendicular to the plane of the V-shaped saddle to permit the cylindrical workpiece to be rotated about its axis while being supported on the rollers.

U.S. Pat. No. 5,165,665, issued on Nov. 24, 1992 to the present Applicant, shows an adjustable collapsible jack mechanism. This adjustable jack mechanism incorporates abase structure having a support tube and a plurality of angulated leg supports projecting radially therefrom so as to allow pivoting of the support legs in two positions parallel to the support tube. The plurality of support legs are pivotally connected to the leg support elements and are stabilized relative to the support by a support ring and pivotal support links. An elevation tube is telescopically movable within the support tube and is selectively locked relative thereto by a primary lock including a locking ring that is angulated by an external locking element for frictional gripping relation with the elevation tube. A jack screw is telescopically positioned within the elevation tube and is vertically adjustable by rotation of an adjustment nut for raising or lowering an object support provided at the upper end thereof.

U.S. Pat. No. 5,934,626, issued on Aug. 10, 1999 to R. H. Collins of the present Applicant, shows an adjustable pipe roll and support mechanism. This support mechanism has a round cross-sectional configuration and has a support base having a pair of parallel upright tubular members having rigid or collapsible support legs. Elevation posts are positioned in movable telescoping relation within respective tubular members and support a roll positioning head having an internal roll positioning mechanism. A pair of rollers assemblies are movably supported on the roll positioning head and in driven relation by the roll positioning mechanism and move toward one another away and from one another for selective positioning of the roller assemblies for rotatable support of ground objects of differing dimensions. The roller assemblies are connected to the roll positioning mechanism by quick disconnect mechanisms to permit the roll assemblies to be changed out to accommodate rotatable support of different types of objects.

U.S. Pat. No. 6,988,719, issued on Jan. 24, 2006 to Ursell et al., describes a stand for movably supporting a workpiece. The stand includes a base, a support and a plurality of roller assemblies. The support is releasably connected to the base for permitting the height of the stand to be altered. The roller assemblies are mounted on diverging surfaces which are, in turn, mounted at oblique angles relative to the support for permitting non-interfering movement of the workpiece relative thereto. Each roller assembly includes a sphere captured within a collar mounted on a selected one of the diverging surfaces for permitting free-rolling movement of the sphere relative to the collar and the workpiece.

U.S. Patent Application Publication No. 2008/0106018, published on May 8, 2008 to B. Bellavance, discloses a pivoting head for a welding stand. The pivoting head apparatus supports a cylindrical object having a longitudinal axis. The pivoting head apparatus comprises a base member and a support member pivotally mounted to the base member so that, in operation, the support member pivots about an axis that is generally perpendicular to the longitudinal axis of a cylindrical object. The pivoting head apparatus further comprises a plurality of rollers for rollably engaging the cylindrical members.

Canadian Patent No. 2,739,005, issued on Oct. 28, 2012, shows a workpiece support assembly. This workpiece support assembly includes a frame member, a first roller assembly having a first swing arm and a first roller rotatably mounted to the first swing arm, and a second roller assembly having a second swing arm and a second roller rotatably mounted to the second swing arm. Each of the first and second swing arms are rotatably mounted to the frame so as to form a space between the first roller and the second roller for receiving the workpiece in rolling contact with the first roller and the second roller such that the workpiece can be rotated about its axis while being supported by the first and second rollers. Each of the first and second swing arms are rotatable to selectively position the first and second rollers towards or away from each other so as to increase or decrease the space therebetween.

Chinese Patent No. 102500984, issued on Jun. 20, 2012, shows a welding lift frame that has a bracket. The upper end of the bracket is provided with a sleeve. A lead screw of a lead screw and nut mechanism is sleeved in the sleeve. The upper end of a lead screw of the lead screw and nut mechanism is provided with a supporting member. A nut of the lead screw and nut mechanism is arranged on the sleeve. The lead screw and nut mechanism can be used for adjusting the height of the supporting member so that the height of the workpiece can be adjusted at any time to facilitate the welding of the workpiece.

It is an object of the present invention to provide a jack stand apparatus and method that facilitates the ability to conveniently weld workpieces.

It is another object of the present invention to provide a jack stand apparatus and method that can accommodate different diameters of pipe.

It is another object of the present invention to provide a jack stand apparatus and method that adapts to the space requirements of the facility, workspace, or transport vehicle.

It is another object of the present invention to provide a jack stand apparatus and method that is smaller and more compact.

It is another object of the present invention provide a jack stand apparatus and method which is disassembleable.

It is a further object of the present invention provide a jack stand apparatus and method which can optimize the center-of-gravity of the workpiece and the jack stand.

It is a further object of the present invention to provide a jack stand apparatus and method which maximizes the height of the jack stand while minimizing the profile of the jack stand.

These and other objects and advantages of the present invention will become apparent from a reading of the attached specification and appended claims.

BRIEF SUMMARY OF THE INVENTION

The present invention is a jack stand apparatus that comprises a frame having a first portion and outwardly extending second portion, a barrel affixed to the outwardly extending second portion and has a generally vertical longitudinal axis, a jack screw threadedly received by the barrel, and a plurality of caster wheels removably affixed to the frame. The barrel has an outer end extending outwardly for a first distance from the frame. The plurality of caster wheels support the frame for a second distance from a level of a bottom of the caster wheels. The first distance is no more than the second distance.

A support head is affixed to an end of the jack screw opposite the barrel. The support head can be a V-head or a roller head. This support head comprises a support frame and a plurality of roller heads mounted on the support frame. The plurality of roller heads are adapted to support a pipe thereon. The support frame has a first slot and a second slot formed therein. One of the plurality of roller heads is adjustably received in the first slot. Another of the plurality of roller heads is adjustably received in the second slot. Each of the first and second slots has a plurality of notches formed therein. The roller head is selectively positioned in one of the plurality of notches. Each of the plurality of roller heads includes a first panel, a second panel arranged in parallel relation to the first panel, and at least one roller rotatably mounted between the first and second panels. Each of the plurality of roller heads further includes a bar extending between the first and second panels. This bar is selectively positionable in one of the plurality of notches.

An adjustment arm is affixed to the jack screw so as to cause the jack screw to rotate relative to the barrel.

The first portion of the frame includes a plurality of legs radiating outwardly of the barrel and a plurality of caster cradles affixed respectively the ends of the plurality of legs. The plurality of caster wheels are respectively removably received in the plurality of caster cradles. Each of the plurality of caster wheels has a shaft extending upwardly therefrom. The shaft is received in the caster cradle. Each of the plurality of cradles has a hole formed through a wall thereof so as to open at an exterior of the cradle and open to an interior of the cradle. A set screw is threadedly received in the hole. The set screw has an inner end bearing against the shaft of the caster wheel. The outwardly extending second portion of the frame includes a plurality of struts that are respectively extending from the plurality of legs. Each of the plurality of struts has one end affixed to each of the plurality of legs and opposite end affixed to the barrel.

In the present invention, the frame is invertible relative to the plurality of caster wheels such that in one position the barrel extends upwardly from the first portion of the frame and a second position in which the barrel extends downwardly from the first portion of the frame. The barrel is open at opposite ends thereof. A pipe can be positioned on the support head so as to be rotatable about a longitudinal axis thereof.

The present invention is also a method of adapting a jack stand apparatus so as to accommodate different diameters of pipe. This method includes the steps of: (1) removing the plurality of caster wheels from the frame; (2) inverting the frame such that the barrel extends downwardly from the frame; (3) attaching the plurality of caster wheels to the frame; and (4) inserting the jack screw into the barrel such that the support head resides above the frame. The step of removing include sliding the shafts of the caster wheels from the caster cradles. The step of attaching include sliding the shafts of the caster wheels respectively into the caster cradles subsequent to the step of inverting and locking the shafts in the caster cradles. The method of the present invention further includes positioning the roller heads in select positions in the slots of the support head. The pipe is rotated relative to the support head.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
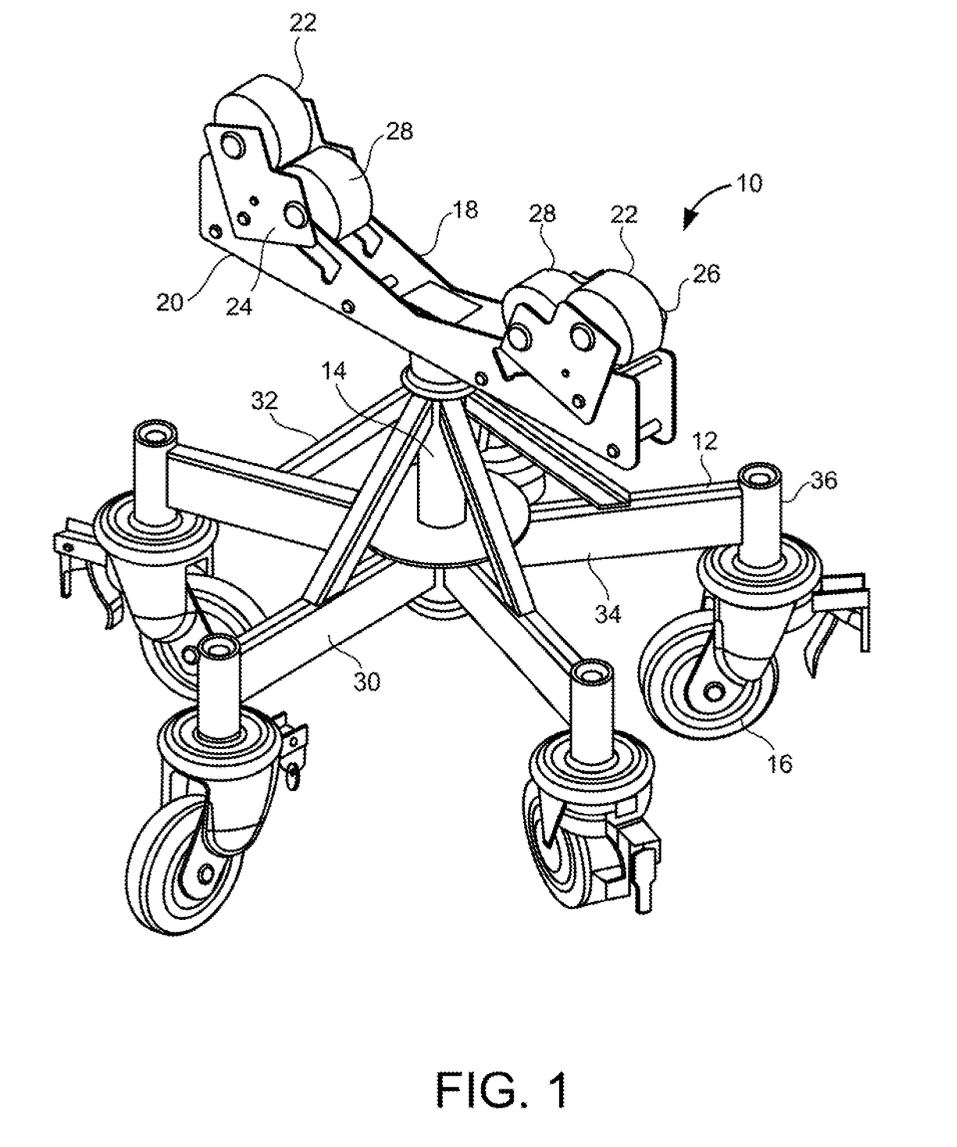
FIG. 1 is a perspective view of the jack stand apparatus of the present invention.

Referring to FIG. 1, there shown the jack stand apparatus 10 in accordance with the preferred embodiment of the present invention. The jack stand apparatus 10 includes a frame 12, a barrel 14 extending outwardly from the frame 12, a jack screw (not illustrated), and a plurality of caster wheels 16. A support head 18 is affixed to the jack screw and is supported above the upper end of the barrel 14. The support head 18 includes a support frame 20 and a plurality of roller heads 22 mounted on the support frames. The plurality of roller heads 22 are adapted so as to receive the outer diameter of a pipe thereon. The support frame 20 includes a first panel 24 and a second panel 26. Rollers 28 are rotatably mounted between the first panel 24 in the second panel 26. The frame 12 has a generally horizontal first portion 30 and an outwardly extending portion 32. The first portion 30 of the frame 12 includes a plurality of legs 34 that radiate outwardly from the barrel 14. A plurality of caster cradles 36 are affixed respectively to the ends of the plurality of legs 34. The plurality of caster wheels 16 are removably received in the plurality of cradles 36.

In FIG. 1, it can be seen that the support head 18 serves to rotatably support a pipe above the frame 12. In FIG. 1, the pipe that is supported by the support head 18 would be of a relatively large diameter. Since the support head 18 is maintained in a lowered position adjacent to the top of the barrel 14, the center of gravity of this relatively large pipe will be relatively low. As such, the jack stand apparatus 10 of the present invention is adapted so as to position the pipe in a convenient location for the welder.

Figure 2:
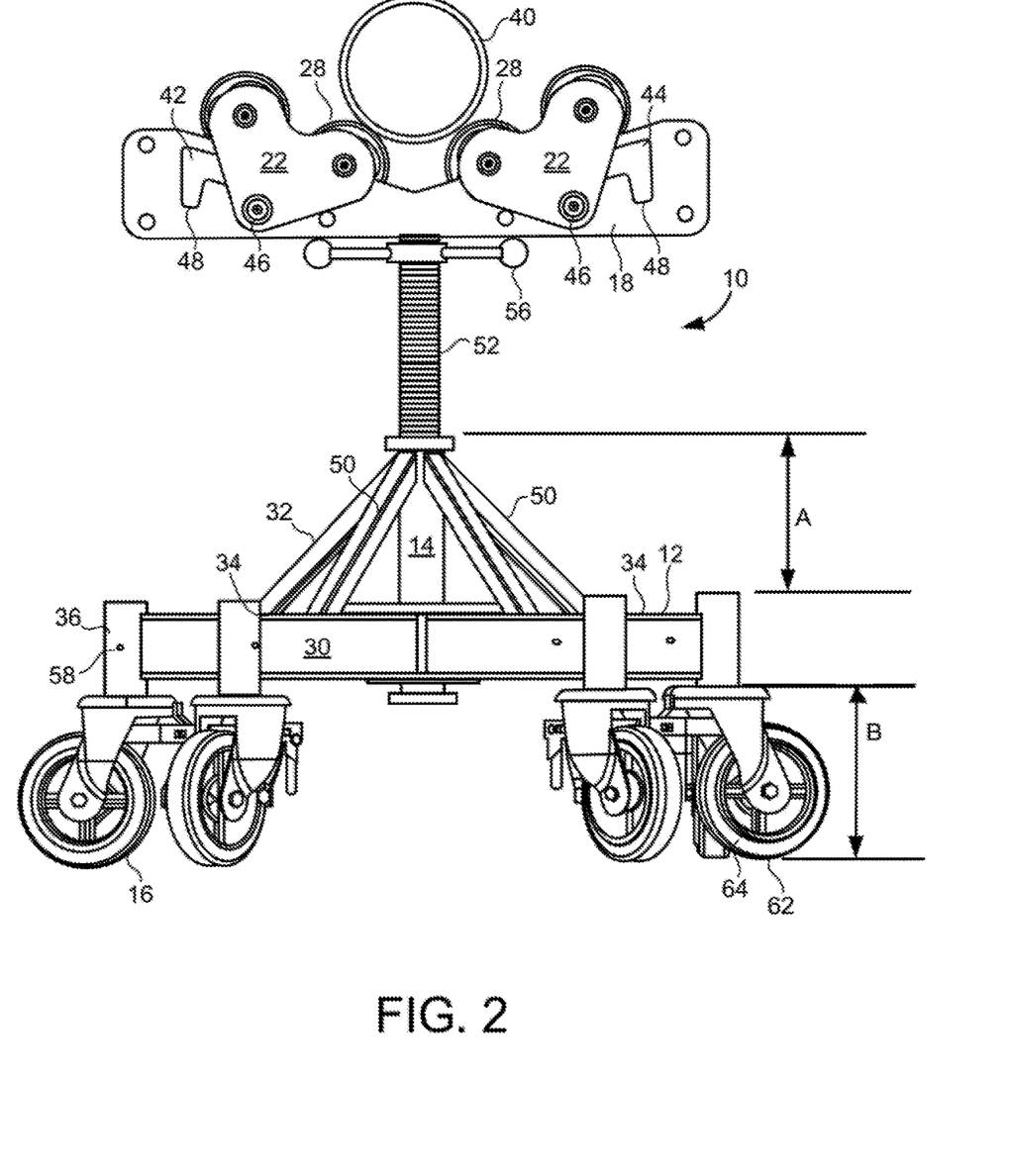
FIG. 2 is a side elevational view of the jack stand apparatus of the present invention in which the frame is in a first position and in which the jack screw is elevated so as to accommodate a small diameter pipe.

FIG. 2 shows, in particular, the placement of a small diameter pipe 40 upon the rollers 28 of the roller heads 22. The small diameter pipe 40 is, for example, a four inch diameter pipe. This four inch diameter pipe is contacted by only the lowermost rollers 28 of the roller heads 22. It can be seen that this small diameter pipe 40 has been elevated by the jack screw 52. The rollers 28 serve to elevate the outer diameter of the pipe 40 a distance above the support head 18. The jack screw 52 serves to elevate the support head 50 a distance outwardly of the barrel 14 and the frame 12. As such, as can be seen in FIG. 2, the small diameter pipe 40 is at a convenient elevated position for the welder. As a result, the jack stand apparatus 10 allows the welder to effectively weld the small diameter pipe 40 without the need to bend over or reach. The small diameter pipe 40 can be rotated by rolling along the rollers 28.

FIG. 2 shows that there is a first slot 42 and a second slot 44 formed in the support head 18. Each of the roller heads 22 includes a bar 46 that extends between the first panel 24 and the second panel 26 of the roller heads 22. The slot 42 includes a plurality of notches 48. As a result, the roller heads 22 can be moved so as to be adjusted toward each other and away from each other and at various angles with respect to each other. For example, the bar 46 can be moved from the position illustrated in FIG. 2 to a position within the outermost notches 48 so as to allow the roller heads 22 to accommodate a large diameter pipe (as will be shown hereinafter). As such, this facilitates the ability of the support head 18 to adapt to the various diameters of pipe 40.

In FIG. 2, it can be seen that the frame 12 has a generally horizontal first portion 30 and outwardly extending second portion 32. The second portion 32 extends upwardly in a generally triangular or pyramidal configuration. The second portion 32 includes struts 50 that have one end affixed to the first portion 30 of the frame 12 and an opposite end affixed to the barrel 14. This triangulated configuration adds structural integrity to the barrel 14 and serves to centralize the barrel 14 relative to the frame 12. The struts 50 also serve to distribute forces across a wider area so that the jack stand apparatus 10 of the present invention can accommodate heavy pipe. It also serves to centralize the pipe 40 so that any toppling, tipping, dislodgment, or instability is prevented.

FIG. 2 further illustrates that the jack screw 52 is threadedly received by the barrel 14 and extends outwardly therefrom. The support head 18 is affixed to the upper end of the jack screw 52. An adjustment arm 56 is affixed to the jack screw 52 such that a rotation of the adjustment arm 56 can provide fine adjustment to the height of the support head 18.

FIG. 2 further illustrates that the legs 34 includes a caster cradle 36 thereof opposite the barrel 14. Each of the legs 34 radiates outwardly of the barrel 14. The caster 16 has a shaft that is received in the caster cradle 36. Importantly, a hole 58 is formed through a wall of the caster cradle 36. Hole 58 will receive a setscrew therein. The setscrew, that is received in the hole 58, can fix the shaft of the caster 16 within the caster cradle 36. The setscrew 58 can have an Allen head.

For the purposes of clarifying the present invention, it can be seen that the second portion 32 of the frame 12 extends above the first portion 30 of the frame 12 for a first distance "A". The bottom of the first portion 30 of the frame 12 extends for a second distance "B" from the bottom 62 of the caster wheel 64. Within the concept of the present invention, it is important that the first distance "A" is no more than the second distance "B".

Figure 3:
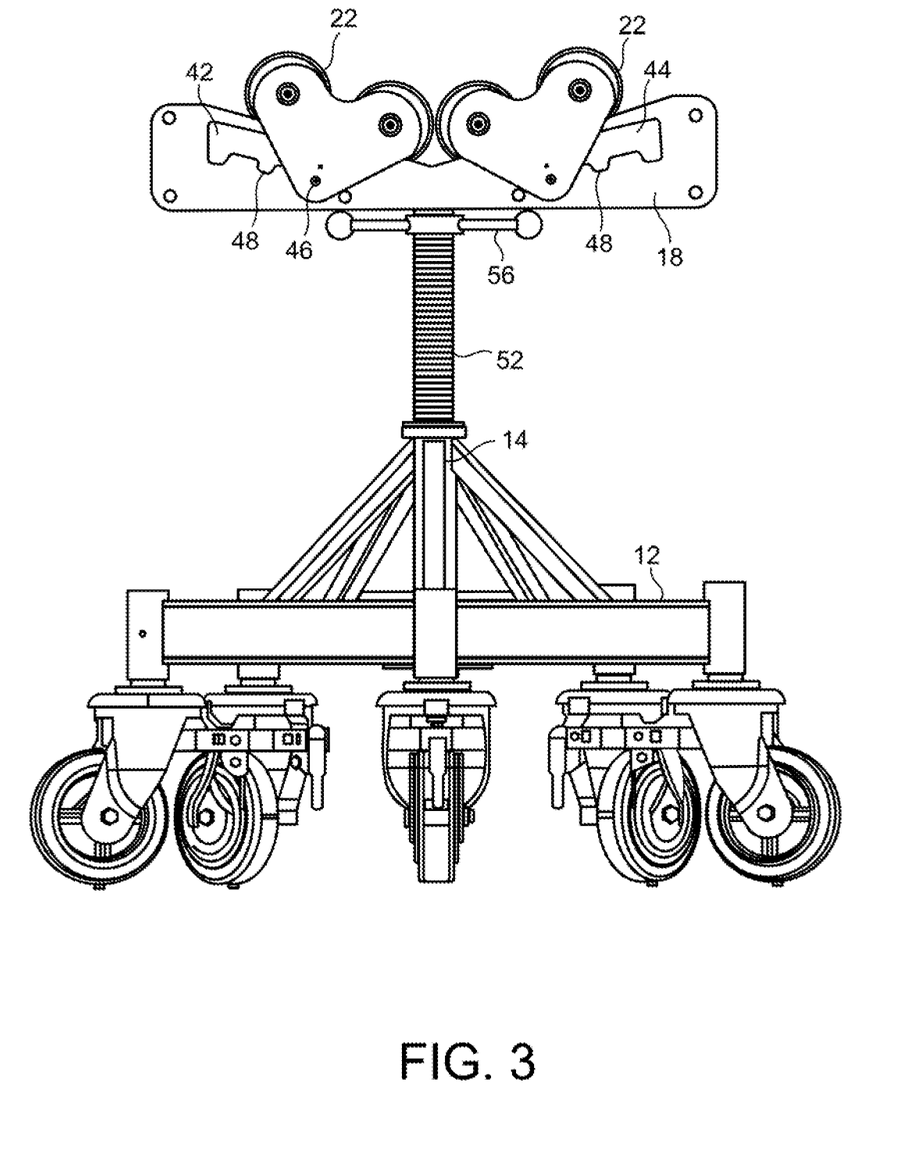
FIG. 3 is a side elevational view of the jack stand apparatus of the present invention in which the jack screw is in an extended position and in which the frame is in the first position.

In FIG. 3, it can be seen that the support head 18 has slots 42 and 44 formed therein. Notches 48 are formed in the slots 42 and 44. The roller heads 22 are moved so that the bar 46 of the caster heads 22 resides in one of the notches 48. As such, the roller heads 22 can be positioned adjacent to each other for accommodating small diameter pipe.

Whenever small diameter pipe needs to be worked on, it is desirable, for the convenience of the welder, to elevate this small diameter pipe to an elevated position. The present invention accommodates this need by allowing the jack screw 52 to be suitably rotated so as to extend a significant distance outwardly of the barrel 14. The adjustment arm 56 can be utilized so as to cause this movement. In this configuration, the support head 18 is located a significant distance above the frame 12. The adjustment arm 56 can also be utilized so as to achieve a fine adjustment of the support head 18 with respect to the jack screw 52.

Figure 4:
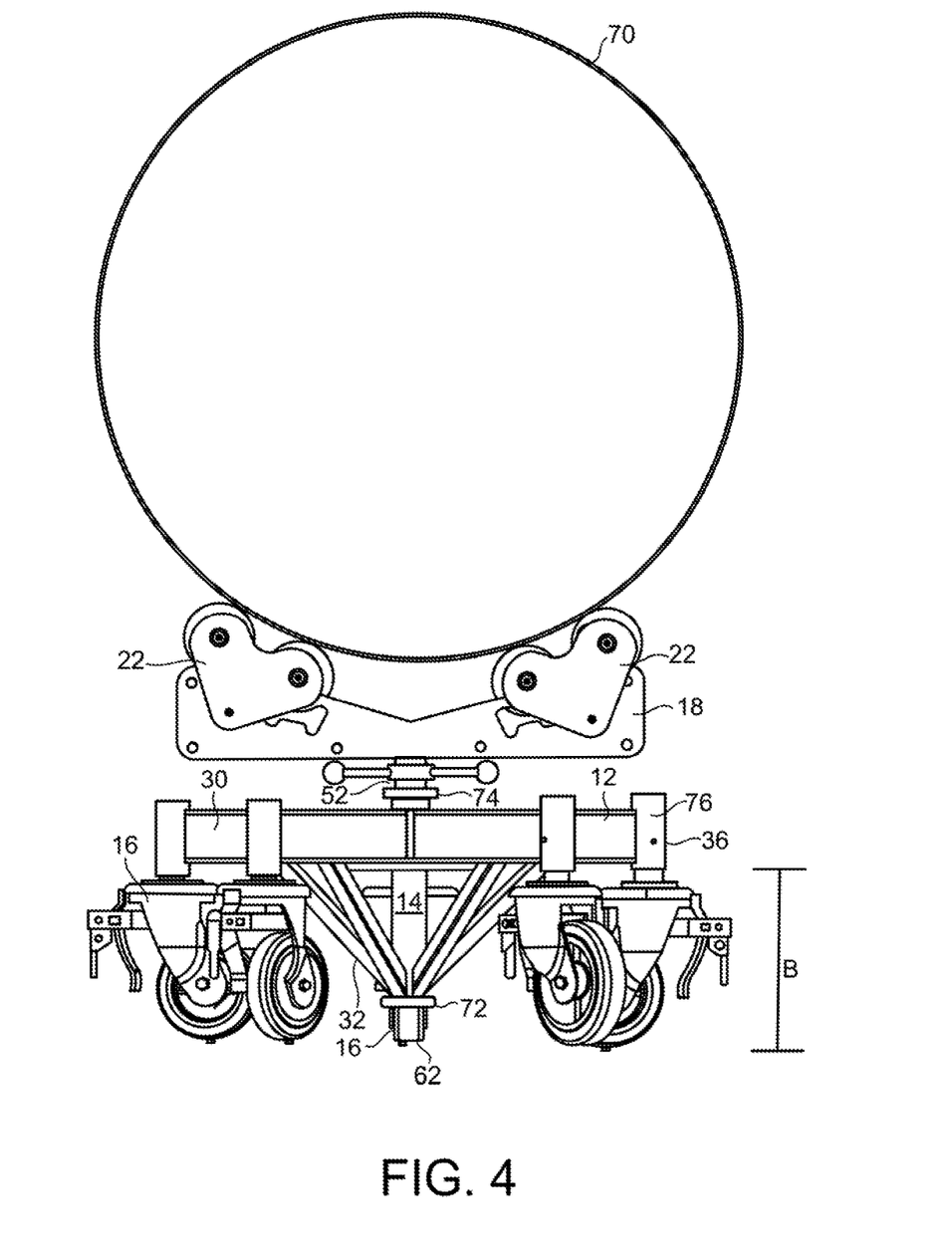
FIG. 4 is a side elevational view of the jack stand apparatus of the present invention in which the frame is in the second position and the jack screw is in a retracted position so as to accommodate a large diameter pipe.

FIG. 4 illustrates a very large diameter pipe 70 as supported upon the support head 18 and upon the rollers of the roller heads 22. Prior to the present invention, it was not possible for the jack stand to accommodate such large diameter pipes since the large diameter pipe would have an elevated position outside of the reach of the welder and also create a center-of-gravity that could be potentially hazardous. The present invention is easily adapted so as to accommodate very large pipes of up to 48 inches in diameter in a convenient location for the welder and with a low center-of-gravity. This is achieved by inverting the second portion 32 of the frame 12 such that the frame 12 is inverted relative to the caster wheels 16.

FIG. 4 shows that the barrel 14 is also inverted so that the upper end (such that is shown in FIGS. 1-3) now becomes the lower end 72. As a result, the jack screw 52 is inserted into the now-upper end 74. As a result, the previous distance "A" representing the height of the second portion 32 of the frame 12 is no more than the second distance "B" (as represented between the lower side of the first portion 30 of frame 12 and the bottom 62 of the caster wheel 16).

In order to accomplish this version of the frame 12, it is only necessary to release the shafts of the caster wheels 16 from the caster cradles 36. In order to release the shafts of the caster wheels 16 from the caster cradles 36, it is only necessary to unscrew the set screw 76. This will allow the shaft of the caster wheel 16 to slide outwardly from its receipt within the caster cradle. The jack screw 52 can be completely removed from the barrel 14. As such, the frame 12 can be properly inverted so that the second portion 32 of the frame 12 extends downwardly. The jack screw 52 can then be inserted into the end 78 of the barrel 14 so as to support the support head 18 a very small distance above the frame 12. This accommodates the very large diameter pipe 70 in a lowered location that is convenient to the welder and also of a low center-of-gravity. The present invention avoids the need to have separate jack stand assemblies for accommodating large diameter pipe.

Figure 5:
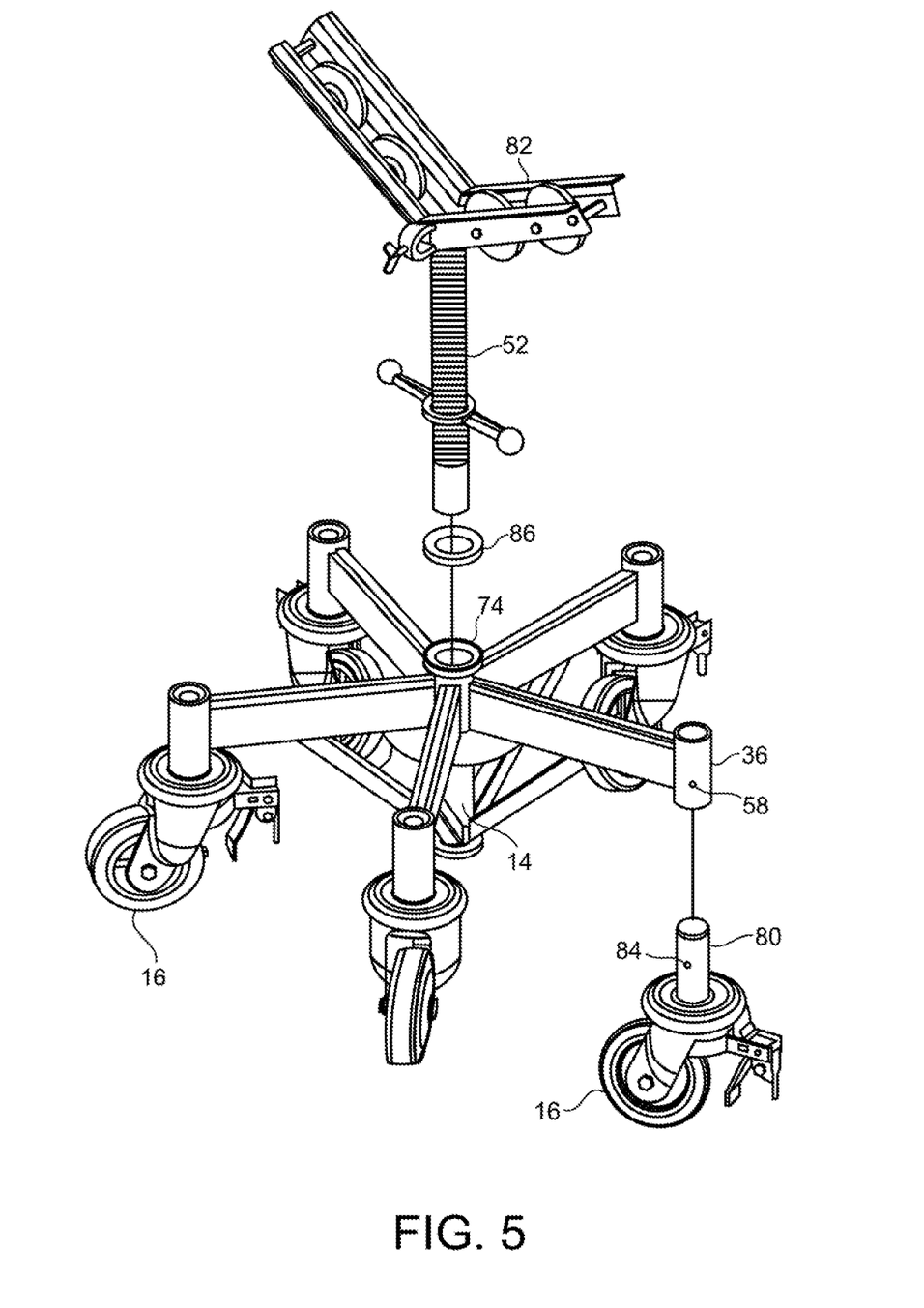
FIG. 5 is an exploded view of the jack stand apparatus of the present invention.

FIG. 5 particularly illustrates how a shaft 80 of the caster wheel 16 is separated from the caster cradle 36. Similarly, FIG. 5 shows that the jack screw 52 has been removed from the upper end 74 of the barrel 14. In FIG. 5, the jack screw 52 is attached, at its upper end thereof, to a V-stand 82.

The shaft 80 of the caster wheel 16, is identical for all of the caster wheels 16. In FIG. 5, it can be seen that there is a small hole 84 formed in the shaft 80. The alignment of this hole 84 with the set screw hole 58 of caster cradle 36 will further assure that there is a fixed relation between the shaft 80 and the caster cradle 36. A suitable set screw can then be inserted through the hole 58 so as to engage with hole 84 such that the caster 16 is fixed in position. The jack screw 52 can then be inserted in threaded relation into the upper end 74 of the barrel 14. A thrust washer 86 is illustrated as positioned in the upper end 74 of the barrel 14 so as to engage with the jack screw 52.

FIG. 5 illustrates that the configuration of the jack stand apparatus 10 of the present invention in which the second portion 32 of the frame 12 is in its downward position can also be adapted to accommodate smaller diameter pipe. In this configuration, the support head 18 is illustrated at a somewhat elevated position by the extension of the jack screw 52 outwardly of the upper end 74 of the barrel 14. The roller heads 22 are positioned close to each other so that a smaller diameter pipe can be placed therein. As a result, the configuration of the present invention will not require a reorienting of the second portion of the frame 12 simply to accommodate smaller diameter pipe. If the welder chooses to work at a lower position, then the smaller diameter pipe can simply be placed on the rollers of the roller heads 22. The illustration of FIG. 4 shows the flexibility of the present invention in being able to accommodate the desires of the welder and the dimensions of the pipe.

Figure 6:
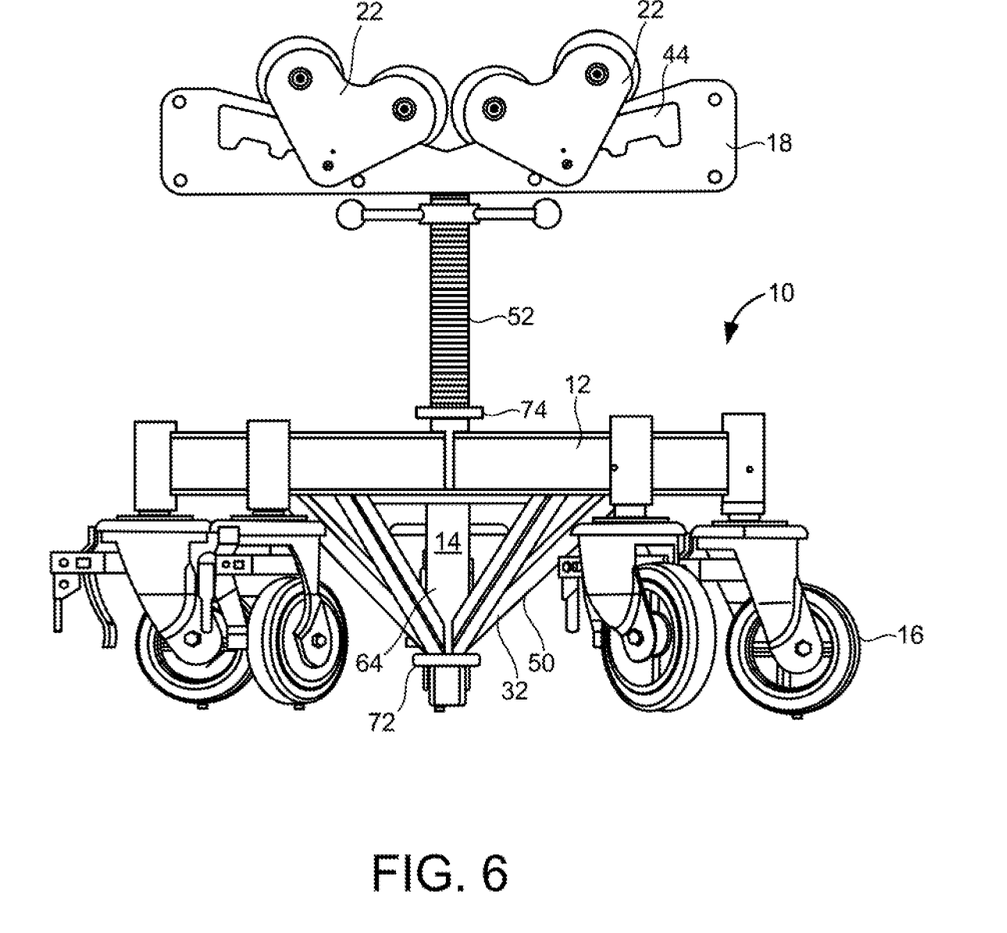
FIG. 6 is a side elevational view showing the jack stand apparatus the present invention in which the frame is in the second position and the jack screw is in an extended position.

Importantly, the orientation of the struts 50 of the second portion 32 of frame 12 once again centralizes the load. This load is centralized to a location adjacent to the bottom of the caster wheels 16 and closer to the floor, or other underlying surface. As such, this centers the loads such that a strong support for heavy pipe is provided with a low center-of-gravity. In FIG. 6, it can be seen that the bottom end 72 of the barrel 14 is slightly elevated a small distance above the level of the bottom of the caster wheels 16.

The foregoing disclosure and description of the invention is illustrative and explanatory thereof. Various changes in the details of the illustrated construction or in the steps of the described method can be made within the scope of the present claims without departing from the true spirit of the invention. The present invention should only be limited by the following claims and their legal equivalents.

I claim:

1. A jack stand apparatus comprising:
    a frame having a first portion and an outwardly extending second portion, said first portion having a plurality of wheels affixed thereto, each said plurality of wheels being movable from a first position to an inverted second position;
    a barrel affixed to said outwardly extending second portion so as to have a generally vertical longitudinal axis, said barrel having a first end located adjacent said first portion of said frame and a second end positioned outwardly therefrom; and
    a support head adjustable in height relative to said barrel;
    wherein at least a portion of said plurality of wheels extends vertically beyond said second end of said barrel when said plurality of wheels are in said inverted second position.

2. The jack stand apparatus of claim 1, said support head positioned on a jack screw, said jack screw threadedly received by said barrel.

3. The jack stand apparatus of claim 1, said plurality of wheels comprising: a plurality of caster wheels.

4. The jack stand apparatus of claim 3, said plurality of caster wheels being removably received by a plurality of caster cradles, said plurality of caster cradles being positioned on said first portion of said frame.

5. The jack stand apparatus of claim 4, each of said plurality of caster wheels having a shaft extending upwardly therefrom, the shaft being received in the caster cradle.

6. The jack stand apparatus of claim 1, said support head being removable from said barrel.

7. The jack stand apparatus of claim 1, said support head comprising a support frame and a plurality of rollers heads mounted on said support frame, said plurality of rollers heads adapted to support a pipe thereon.

8. The jack stand apparatus of claim 7, said support frame having a first slot and a second slot formed therein, one of said plurality of rollers heads adjustably received in said first slot, another of said plurality of rollers heads adjustably received in said second slot.

9. The jack stand apparatus of claim 8, each of said first and second slots having a plurality of notches formed therein, the roller head being selectively positioned in one of said plurality of notches.

10. The jack stand apparatus of claim 9, each of said plurality of rollers heads comprising: a first panel;
    a second panel arranged in parallel relation to said first panel; and
    at least one roller rotatably mounted between said first and second panels.

11. A jack stand apparatus comprising:
    a frame having a first portion and an outwardly extending second portion, said first portion having a plurality of wheels affixed thereto, each said plurality of wheels being movable from a first position to an inverted second position; and
    a barrel affixed to said outwardly extending second portion so as to have a generally vertical longitudinal axis, said barrel having a first end located adjacent said first portion of said frame and a second end positioned outwardly therefrom;
    wherein at least a portion of said plurality of wheels extends vertically beyond said second end of said barrel when said plurality of wheels are in said inverted second position.

12. The jack stand apparatus of claim 11, further comprising a jack screw threadedly received by said barrel, and wherein:
    when said plurality of wheels are in said first position, said jack screw is threadedly received by said second end of said barrel; and
    when said plurality of wheels are in said inverted second position, said jack screw is threadedly received by said first end of said barrel.

13. The jack stand apparatus of claim 11, further comprising a support head adjustably positioned relative to said barrel, wherein said support head is received by said second end of said barrel when said plurality of wheels are in said first position; and wherein said support head is received by said first end of said barrel when said plurality of wheels are in said inverted second position.

14. The jack stand apparatus of claim 11, said plurality of wheels comprising: a plurality of caster wheels.

15. The jack stand apparatus of claim 14, said plurality of caster wheels being removably received by a plurality of caster cradles, said plurality of caster cradles being positioned on said first portion of said frame.

16. A method of adapting a jack stand apparatus so as to accommodate different diameters of pipe, the jack stand apparatus having a frame with a barrel extending therefrom, a support head adjustably positioned relative to the barrel, and, a plurality of wheels mounted to the frame, the method comprising:
    detaching the support head from the barrel;
    inverting the frame such that the barrel extends downwardly from the frame; inverting the plurality of wheels so as to extend downwardly from the inverted frame; and reattaching the support head to the barrel such that the support head resides above the frame.

17. The method of claim 16, the support head being affixed to a jack screw, the jack screw being threadedly received by the barrel.

18. The method of claim 15, the frame having a plurality of caster cradles attached thereto, the plurality of wheels comprising a plurality of caster wheels removably attached to the plurality of caster cradles.

* * * * *